United States Patent [19]
Gould

[11] 3,861,703
[45] Jan. 21, 1975

[54] LUGGAGE CARRIER

[76] Inventor: Lillian Gould, 100 Beekman St., New York, N.Y. 10038

[22] Filed: Apr. 23, 1973

[21] Appl. No.: 353,756

[52] U.S. Cl............ 280/47.13 R, 24/204, 190/18 A, 280/47.17, 280/47.34
[51] Int. Cl........................ A45c 13/38, B62b 3/02
[58] Field of Search .... 280/47.13, 35, 47.17, 47.34; 190/18 A; 16/30; 24/204

[56] References Cited
UNITED STATES PATENTS

| | | | |
|---|---|---|---|
| 2,392,926 | 1/1946 | Kelly | 190/39 |
| 2,964,329 | 12/1960 | Beck | 280/47.13 R X |
| 3,130,111 | 4/1964 | Izumi | 24/204 X |
| 3,414,093 | 12/1968 | Chostner | 24/204 X |
| 3,655,215 | 4/1972 | Becklin | 280/37 |
| 3,754,773 | 8/1973 | Bruno | 280/47.13 R |

*Primary Examiner*—Leo Friaglia
*Attorney, Agent, or Firm*—Armand E. Lackenbach

[57] ABSTRACT

Caster wheels which are attachable to and detachable from containers such as items of luggage by means of bonded Velcro strips. The Velcro strips are formed so as to attach to each other, with one Velcro strip having a surface of hooked projections which latch onto the mating surface of projecting loops of the other Velcro strip. One Velcro strip is fastened to the bottom of the luggage container by means of adhesive or other fastening means, and the mating Velcro strip is fastened to one or more caster wheel mountings.

4 Claims, 7 Drawing Figures

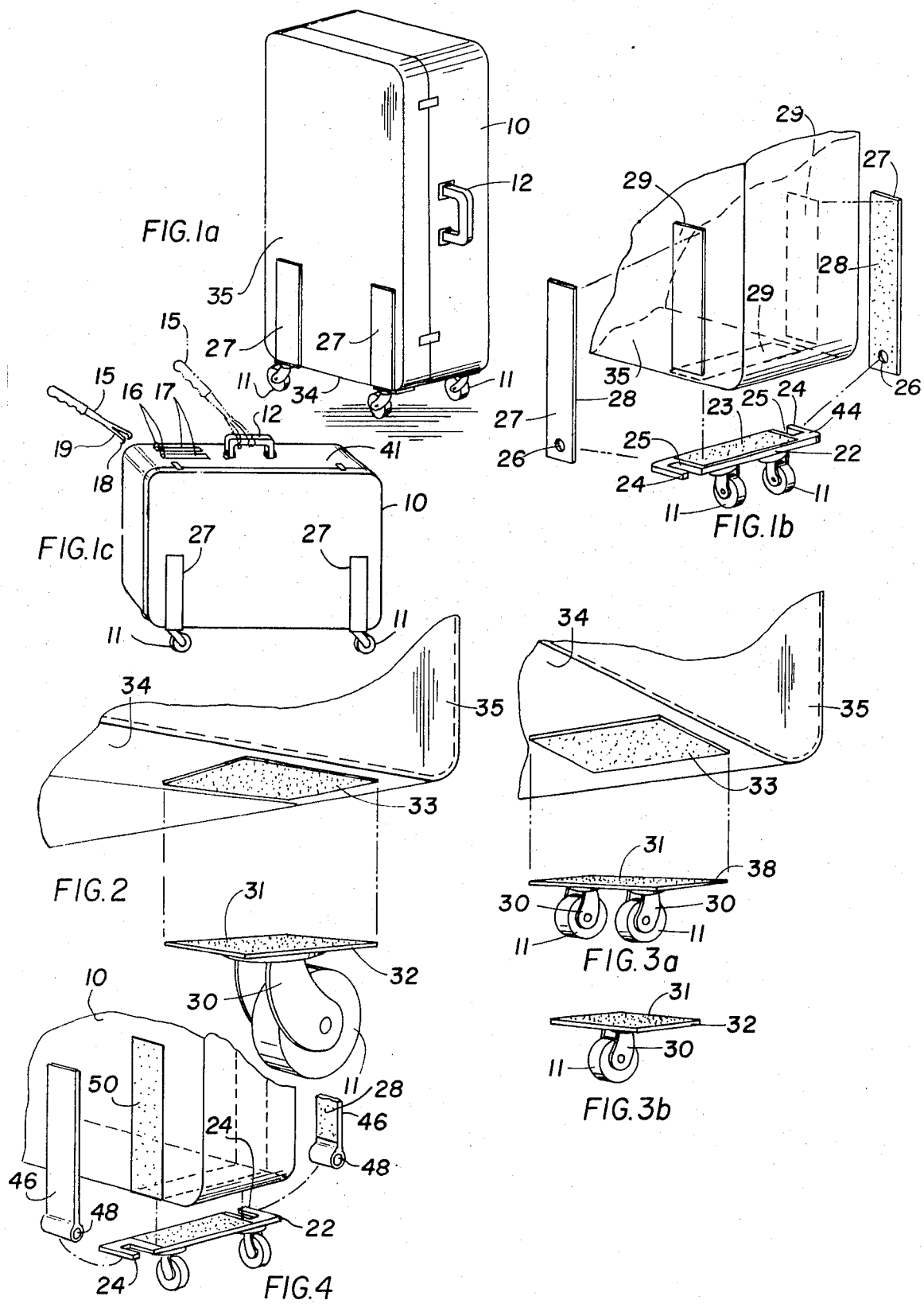

LUGGAGE CARRIER

SUMMARY OF THE INVENTION

This invention relates to a means of attaching or detaching caster wheels to or from a container, and particularly the fastening of caster wheels to a container such as an item of luggage by use of attachable mating Velcro tape strips.

An advantage of this invention is that caster wheels may be readily attached without the use of tools to a suitcase or other container when it is necessary to wheel the container.

A further advantage of this invention is that the caster wheel or wheels may be readily removed, without the use of tools, when the container is shipped by common carrier, or when the container is in the storage mode.

A further advantage of this invention is that by means of this invention, existing container, suitcases and trunks may be readily equipped, so as to be adaptable for the attachment or detachment of caster wheels as required.

While the accompanying description of the preferred embodiment specifies the use of Velcro tape, it will be understood that any type of manufacture of attachable tape may be employed when the surface of said attachable tape is designed to latch onto a similar or mating surface of another section of attachable tape, such latching action being repeatedly detachable or attachable.

BRIEF DESCRIPTION OF THE DRAWING

The objects and features of the invention may be understood with reference to the following detailed description of an illustrative embodiment of the invention, taken together with the accompanying drawing in which:

FIG. 1a is a perspective view of a suitcase equipped with caster wheels fastened in accordance with the teachings of this invention;

FIG. 1b is a fragmentary exploded perspective view of the invention;

FIG. 1c is a perspective view of a suitcase mounted on caster wheels, and an attachable handle which may be employed to guide the suitcase;

FIG. 2 is a fragmentary exploded perspective view of an alternate form of the invention;

FIG. 3a is a fragmentary exploded perspective view of the use of a pair of double caster wheels;

FIG. 3b is a perspective view of a single caster wheel unit which is replaceable for the double wheel unit shown in FIG. 3a; and FIG. 4 is an exploded perspective view of an alternate means of attachment of the caster wheels to the suitcase sides.

DESCRIPTION OF THE PREFERRED EMBODIMENT

Turning now descriptively to the drawing, in which similar reference characters denote similar elements throughout the several views, FIG. 1a illustrates a suitcase 10 which is equipped with caster wheels 11 fastened to the bottom 34 and sides 35 of the suitcase 10 so that the suitcase 10 may be easily rolled about. In guiding the suitcase 10 while it is mounted on caster wheels 11, the conventional suitcase handle 12 may be grasped when it is within reach in the upright position, or as shown in FIG. 1c a detachable handle 15 may be fastened to the upper side 41 of the suitcase 10, with hooks 18 at the end of prongs 19 projecting from detachable handle 15 adaptable for latching into eyes 16 fastened by adhesive straps 17 to the upper side 41 of the suitcase 10. Handle 15 may alternately be employed to grasp the conventional suitcase handle 12 for guiding purposes as shown in the dotted line view of FIG. 16. The use of detachable handle 15 eliminates the need for stooping when the luggage is rolled along in its normal position.

FIG. 1b illustrates the manner in which a pair of caster wheels 11 mounted on plate 22 may be fastened by the use of Velcro tape to both the bottom 34 and the sides 35 of the suitcase 10 to provide a sturdy and structurally supported attachment. The plate 22 on which two caster wheels 11 are mounted is furnished with transverse end slots 25 and transverse end prongs 24 and may be linked with side plates 27, each of which bears a hole 26 of a diameter to fit about transverse end prong 24 and the prong base 44 which joins transverse end prong 24 to plate 22.

The bottom 34 and the sides 35 of the suitcase 10 are covered by strips of Velcro tape 29. The inner surface of the Velcro tape 29 may be coated with an adhesive to adhere to the sides or bottom of the suitcase 10 or the Velcro tape may be clipped to or fastened to the sides or bottom of suitcase 10 by other means. The outer surface of the Velcro tape is formed with a series of projections in the general shape of open hooks. This Velcro tape "male" surface may be attached to or detached from a Velcro tape "female" surface formed with projections in the general shape of closed loops. The Velcro tape 23 bearing the projecting loop surface is fastened by adhesives or other type of fasteners to the inner surface of plate 22 which bears the casters 11, and a similar Velcro tape 28 is fastened to the inner surface of plate 27 which hooks on to the caster plate 22 by means of holes 26. Caster plate 22 may now be readily attached to the bottom 34 of the suitcase 10, by merely pressing the attached Velcro loop surface 23 fastened to the plate 22, against the Velcro hook surface 29 which is fastened to the bottom 34 of the suitcase. Side plates 27 are similarly hooked to the caster plate 22 and then fastened to the mating Velcro tapes 29 which are fastened to the sides 35 of the suitcase 10.

In this fashion, the caster plate 22 may be attached to the bottom of the suitcase as desired and removed when no longer needed.

FIG. 2 illustrates the attachment of single caster unit 30 to which a single caster wheel 11 is fastened to the bottom 34 of a luggage container, with the exposing hook surface of Velcro tape 33 permanently fastened to the bottom 34 of the suitcase 10 and exposing loop surface of Velcro tape 31 permanently fastened to the attachment plate 32 of the caster unit 30.

As shown in FIG. 3a, two caster units 30 may be joined to one caster attachment plate 38 for simultaneous mounting to the bottom 34 of a suitcase 10 or alternately as shown in FIG. 3b, a caster unit 32 bearing one caster wheel 11 may be joined to the bottom 34 of the suitcase 10 by means of mating Velcro tapes 33 permanently fastened to the bottom of the suitcase and Velcro tape 31 permanently fastened to the caster plate.

As shown in FIG. 4, the caster wheel plate 22 may be fastened to the suitcase 10 by means of straps 46 which are fitted on their internal surface with Velcro tape 28 so as to fasten to Velcro tape 50 mounted on the sides of the suitcase. Straps 46 are formed in the shape of a loop 48 which is mounted so as to project below the bottom of the suitcase. Loop 48 is of a size to grip prong 24 of caster plate 22.

When the caster plates are not required, they may be readily removed from the suitcase and stored, permitting the suitcase to be employed or stored in a conventional manner.

Each of the two straps 46 on either side of the suitcase may encircle the suitcase. One strap is provided with a loop construction and the other is provided with a hook construction which are attached to each other to permit the straps to be more securely held in place on the suitcase to secure the casters to the suitcase.

Since obvious changes may be made in the specific embodiment of the invention described herein, it is indicated that all matter contained herein is intended as illustrative and not as limiting in scope.

Having thus described my invention, what I claim as new and desire to secure by letters patents of the United States is:

1. Caster wheel assembly capable of attachment or detachment from a container as required, said caster wheel assembly having a plate, sections of attachable tape mounted on the bottom and adjacent sides of the container and on the plate surface, the exposed surfaces of such tapes being shaped with projections which mate with each other thereby to effect the binding of the caster wheel assembly plate to the attachable tape on the bottom of the container when the said exposed mating surfaces of attachable tape are engaged together, said caster plate being formed with an open slot adjacent each end thereof so as to form a hook section at each end of the plate, a pair of sections of attachable tape each having a loop at one end thereof of such size to fit over a respective hook section when such tapes are fastened to the mating attachable tapes mounted on the respective sides of the container.

2. A caster wheel assembly as recited in claim 1 in which the open slot caster plate assembly is formed by a prong extending therefrom and wherein the bottom tape is removably mounted on said container, said caster plate assembly being removably mounted on said tape by means of said prong.

3. A caster wheel assembly as claimed in claim 1 wherein a pair of tapes are removably mounted on said container and are adapted to encircle said container.

4. A caster wheel assembly as claimed in claim 1 wherein one of said tapes has a hook construction and the other of said tapes has a loop construction and the two tapes are adapted to attach to each other to be held in place on the container.

* * * * *